US012793881B2

(12) United States Patent
Yu et al.

(10) Patent No.: US 12,793,881 B2

(45) Date of Patent: Nov. 10, 2026

(54) THIN-FILM POWER INDUCTOR

(71) Applicant: HENGDIAN GROUP DMEGC MAGNETICS CO., LTD, Jinhua (CN)

(72) Inventors: Yangdong Yu, Jinhua (CN); Quan Zhu, Jinhua (CN); Leijie Wang, Jinhua (CN); Fei Wang, Jinhua (CN)

(73) Assignee: Hengdian Group DMEGC Magnetics Co., Ltd, Jinhua (CN)

( * ) Notice: Subject to any disclaimer, the term of this patent is extended or adjusted under 35 U.S.C. 154(b) by 374 days.

(21) Appl. No.: 17/611,468

(22) PCT Filed: Apr. 28, 2021

(86) PCT No.: PCT/CN2021/090466

§ 371 (c)(1),
(2) Date: Apr. 28, 2022

(87) PCT Pub. No.: WO2022/083092

PCT Pub. Date: Apr. 28, 2022

(65) Prior Publication Data

US 2023/0360839 A1 Nov. 9, 2023

(30) Foreign Application Priority Data

Oct. 20, 2020 (CN) ......................... 202011125941.X

(51) Int. Cl.

| | |
|---|---|
| ***H01F 27/28*** | (2006.01) |
| ***H01F 27/24*** | (2006.01) |
| ***H01F 27/29*** | (2006.01) |

(52) U.S. Cl.

CPC ......... *H01F 27/2804* (2013.01); *H01F 27/24* (2013.01); *H01F 27/292* (2013.01); *H01F 2027/2809* (2013.01)

(58) Field of Classification Search

CPC .... H01F 27/2804; H01F 27/24; H01F 27/292; H01F 2027/2809; H01F 17/0013;
(Continued)

(56) References Cited

U.S. PATENT DOCUMENTS

2007/0296538 A1* 12/2007 Maeda ................ H01F 17/0013 336/232
2013/0200980 A1* 8/2013 Yokoyama ............ H01F 27/292 336/200

(Continued)

FOREIGN PATENT DOCUMENTS

CN 101840768 A 9/2010
CN 102867634 A 1/2013

(Continued)

OTHER PUBLICATIONS

International Search Report for International Patent Application No. PCT/CN2021/090466, mailed Jul. 15, 2021.

(Continued)

*Primary Examiner* — Mang Tin Bik Lian

(74) *Attorney, Agent, or Firm* — Andrus Intellectual Property Law, LLP

(57) ABSTRACT

Provided is a thin-film power inductor. The thin-film power inductor includes a magnet, a first port electrode, and a second port electrode. The magnet includes at least one first sub-structure. A first sub-structure includes a first upper functional layer, a first upper coil, a first upper adhesive layer, a first insulating layer, a first lower adhesive layer, a first lower coil, and a first lower functional layer that are stacked in sequence. A first end of the first upper coil and a first end of the first lower coil are exposed to a same surface of the magnet and are both electrically connected to the first port electrode. A second end of the first upper coil and a second end of the first lower coil are exposed to a same (Continued)

surface of the magnet and are both electrically connected to the second port electrode.

13 Claims, 8 Drawing Sheets

(58) Field of Classification Search
CPC ........ H01F 17/04; H01F 27/29; H01F 27/303; H01F 27/306
See application file for complete search history.

(56) References Cited

U.S. PATENT DOCUMENTS

| | | | | |
|---|---|---|---|---|
| 2014/0203891 | A1* | 7/2014 | Yazaki | H01H 85/046 333/176 |
| 2015/0035634 | A1* | 2/2015 | Nakamura | H01F 41/046 336/170 |
| 2015/0048918 | A1* | 2/2015 | Park | H01F 17/0013 336/200 |
| 2015/0102887 | A1* | 4/2015 | Park | H01F 41/041 336/200 |
| 2015/0287514 | A1* | 10/2015 | Lim | H01F 17/0033 336/200 |
| 2016/0086721 | A1* | 3/2016 | Park | H01F 41/042 336/200 |
| 2016/0217917 | A1* | 7/2016 | Jeong | H01F 27/292 |
| 2017/0084380 | A1* | 3/2017 | Lee | H01F 17/0013 |
| 2018/0122554 | A1* | 5/2018 | Ryu | H01F 27/2804 |
| 2018/0374636 | A1* | 12/2018 | Itani | H01F 27/24 |
| 2019/0013141 | A1 | 1/2019 | Yoon | |
| 2019/0311829 | A1 | 10/2019 | Kang | |
| 2020/0027644 | A1 | 1/2020 | Ryu | |
| 2020/0243251 | A1* | 7/2020 | Yoshino | H01F 41/069 |
| 2021/0090786 | A1* | 3/2021 | Arai | H01F 17/0013 |
| 2022/0037083 | A1* | 2/2022 | Arai | H01F 27/24 |

FOREIGN PATENT DOCUMENTS

| | | | |
|---|---|---|---|
| CN | 104575936 | A | 4/2015 |
| CN | 106449012 | A | 2/2017 |
| CN | 107799268 | A | 3/2018 |
| CN | 107871587 | A | 4/2018 |
| CN | 109215972 | A | 1/2019 |
| CN | 109690708 | A | 4/2019 |
| CN | 110739137 | A | 1/2020 |
| CN | 112151246 | A | 12/2020 |
| CN | 213070861 | U | 4/2021 |
| KR | 20170125658 | A | 11/2017 |

OTHER PUBLICATIONS

Extended European Search Report for European Patent Application No. 21761960.0, dated Oct. 26, 2023.
Search Report for Chinese Patent Application No. 202011125941.X, dated Dec. 26, 2024.
First Office Action for Chinese Patent Application No. 202011125941.X, dated Dec. 28, 2024.

* cited by examiner

THIN-FILM POWER INDUCTOR

CROSS-REFERENCE TO RELATED APPLICATIONS

This is a National Stage Application filed under 35 U.S.C. 371 based on International Patent Application No. PCT/CN2021/090466, filed on Apr. 28, 2021, which claims priority to Chinese Patent Application No. 202011125941.X filed with the CNIPA on Oct. 20, 2020, the disclosure of both of which is incorporated herein by reference in their entireties.

TECHNICAL FIELD

Embodiments of the present application relate to the field of electronic devices, for example, a thin-film power inductor.

BACKGROUND

An inductor (also referred to as a choke, a reactor, or a dynamic reactor) is an element that can convert electric energy into magnetic energy for storage. A power inductor is commonly used in a power circuit or an intelligent electronic device and may be categorized into a laminated power inductor, a thin-film power inductor, or a wire-wound power inductor.

As the development trend of intelligent devices follows high frequency, miniaturization, and large current, power inductors are required for increasingly small sizes and increasingly high rated currents. Laminated power inductors have poor anti-saturation performance. Thicknesses of wire-wound power inductors are difficult to decrease. Accordingly, with the advantages of small direct current resistance, high self-resonant frequency, tolerance to large currents, and easiness for miniaturization and thinness, thin-film inductors have become the development trend of power inductors.

In the related art, a puncture is required for connecting coils in a thin-film power inductor or a staggered arrangement is required for the coils in a thin-film power inductor, which make the thin-film power inductor have a complicated structure, and cause the thin-film power inductor to be manufactured difficultly.

SUMMARY

The present application provides a thin-film power inductor. The thin-film power inductor has advantages including a simple structure, a large inductance, a small direct current resistance, and an easy miniaturization.

In a first aspect, embodiments of the present application provide a thin-film power inductor. The thin-film power inductor includes a magnet, a first port electrode, and a second port electrode. The first port electrode and the second port electrode are disposed on the outer surface of the magnet separately.

The magnet includes at least one first sub-structure. A first sub-structure includes a first upper functional layer, a first upper coil, a first upper adhesive layer, a first insulating layer, a first lower adhesive layer, a first lower coil, and a first lower functional layer that are stacked in sequence.

The first upper coil and the first lower coil each includes a first end and a second end. The first end of the first upper coil and the first end of the first lower coil are exposed to a same surface of the magnet and are both electrically connected to the first port electrode. The second end of the first upper coil and the second end of the first lower coil are exposed to a same surface of the magnet and are both electrically connected to the second port electrode.

DETAILED DESCRIPTION

Figure 1:
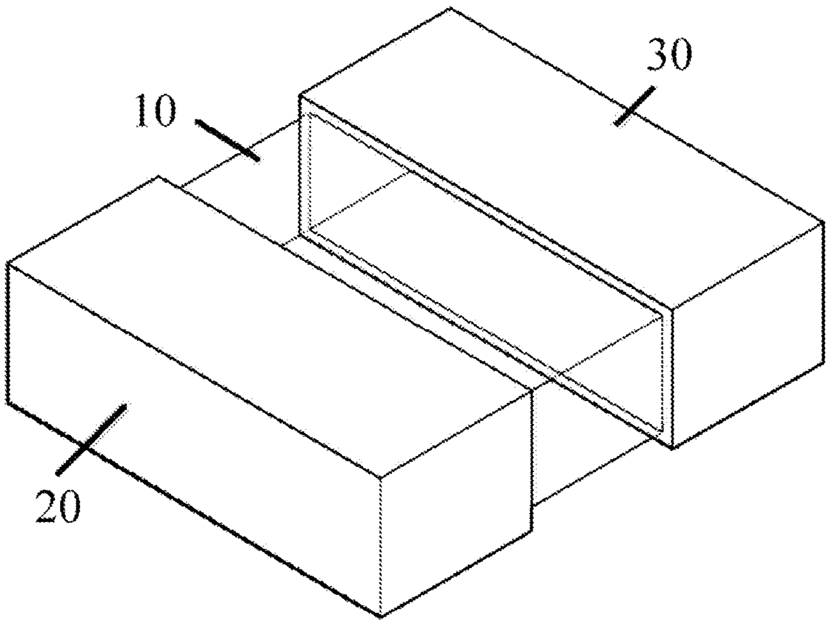
FIG. 1 is a stereoscopic view of a thin-film power inductor according to embodiments of the present application.

The present application is further described in detail in conjunction with the drawings and the embodiments. It is to be understood that the embodiments set forth below are intended to illustrate and not to limit the present application. Additionally, it is to be noted that for ease of description, only part, not all, of structures related to the present application are illustrated in the drawings.

The description of the drawings and the embodiments are illustrative. Same reference numerals throughout the specification denote same elements. Additionally, for ease of understanding and description, sizes of structures and sizes of regions in the drawings may be exaggerated. Additionally, unless explicitly described to the contrary, the word "include" and variations of "comprise", "have", or the like are understood to imply the inclusion of the element but not the exclusion of any other elements.

In embodiments of the present application, "first", "second", and the like are used for describing various elements. These terms are only used for distinguishing one element from another. Moreover, unless otherwise indicated clearly by context, singular forms such as "a", "a type", and "the" are also intended to include plural forms.

When an embodiment may be implemented differently, the processes may be performed in an order different from that described herein. For example, two processes described successively may be basically implemented at a same time, or may be implemented in an order opposite to that described herein.

A thin-film power inductor and its technical effect are described in the following.

FIG. 1 is a stereoscopic view of a thin-film power inductor according to embodiments of the present application. As shown in FIG. 1, the thin-film power inductor includes a magnet 10, a first port electrode 20, and a second port electrode 30. The first port electrode 20 and the second port electrode 30 are disposed on an outer surface of the magnet 10 separately.

In an embodiment, the first port electrode 20 is an input electrode IN of the thin-film power inductor; the second port electrode 30 is an output electrode OUT of the thin-film power inductor. In an embodiment, the first port electrode 20 is an output electrode OUT of the thin-film power inductor; the second port electrode 30 is an input electrode IN of the thin-film power inductor.

The first port electrode 20 and the second port electrode 30 may be formed by coating silver paste at designated ports of the magnet 10, and electroplating after the silver paste is solidified at a low temperature.

A number of coils (also referred to as inductor coils) included in the magnet 10 may be designed according to a magnitude of an inductance of the thin-film power transistor. Specifically, the number of coils may be any positive integers.

For a detailed description of the structure of the magnet 10 in a case where a number of coils varies, a first sub-structure, a second sub-structure, and a third sub-structure are described separately herein.

Figure 2:
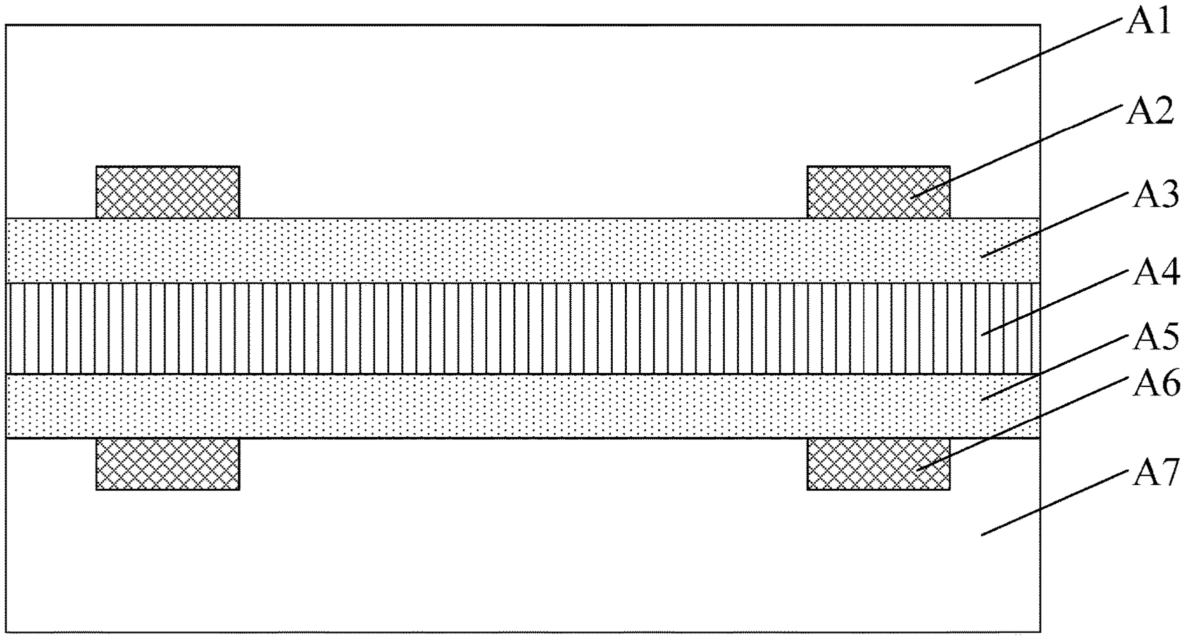
FIG. 2 is a section view of a first sub-structure according to embodiments of the present application.

FIG. 2 is a section view of a first sub-structure according to embodiments of the present application. As shown in FIG. 2, the first sub-structure includes a first upper functional layer A1, a first upper coil A2, a first upper adhesive layer A3, a first insulating layer A4, a first lower adhesive layer A5, a first lower coil A6, and a first lower functional layer A7 that are stacked in sequence.

Figure 3:
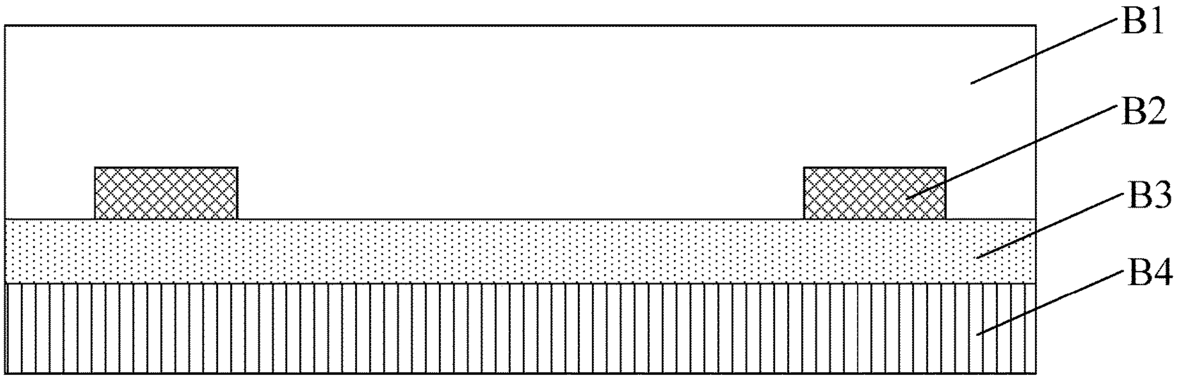
FIG. 3 is a section view of a second sub-structure according to embodiments of the present application.

FIG. 3 is a section view of a second sub-structure according to embodiments of the present application. As shown in FIG. 3, the second sub-structure includes a second functional layer B1, a second coil B2, a second adhesive layer B3, and a second insulating layer B4 that are stacked in sequence.

Figure 4:
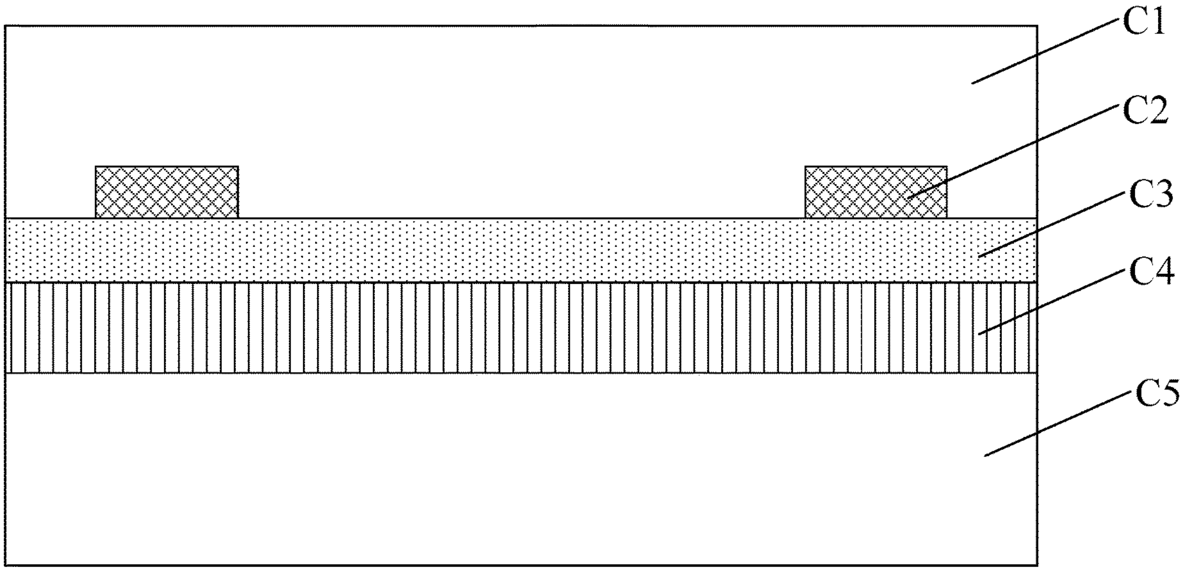
FIG. 4 is a section view of a third sub-structure according to embodiments of the present application.

FIG. 4 is a section view of a third sub-structure according to embodiments of the present application. As shown in FIG. 4, the third sub-structure includes a third upper functional layer C1, a third coil C2, a third adhesive layer C3, a third insulating layer C4, and a third lower functional layer C5 that are stacked in sequence.

Referring to FIGS. 2 to 4, functional layers may be the first upper functional layer A1, the first lower functional layer A7, the second functional layer B1, the third upper functional layer C1, and the third lower functional layer C5. The functional layers may be manufactured using a same manufacturing process and may be made of a same material, and the functional layers herein are merely used for distinguishing different positions of the functional layers. Likewise, coils may be the first upper coil A2, the first lower coil A6, the second coil B2, and the third coil C2. Adhesive layers may be the first upper adhesive layer A3, the first lower adhesive layer A5, the second adhesive layer B3, and the third adhesive layer C3. Insulating layers may be the first insulating layer A4, the second insulating layer B4, and the third insulating layer C4.

The functional layers are configured to cover the coils, to increase an inductance of the thin-film power inductor, which is generated by self-induction of the coils. Each adhesive layer is configured to adhere layers on two sides of the adhesive layer to each other. The insulating layers are configured to guarantee insulation between the coils.

In a first possible implementation, when the number of coils of the thin-film power transistor is 2n (n is a positive integer), the magnet 10 includes n first sub-structures that are stacked.

Figure 5:
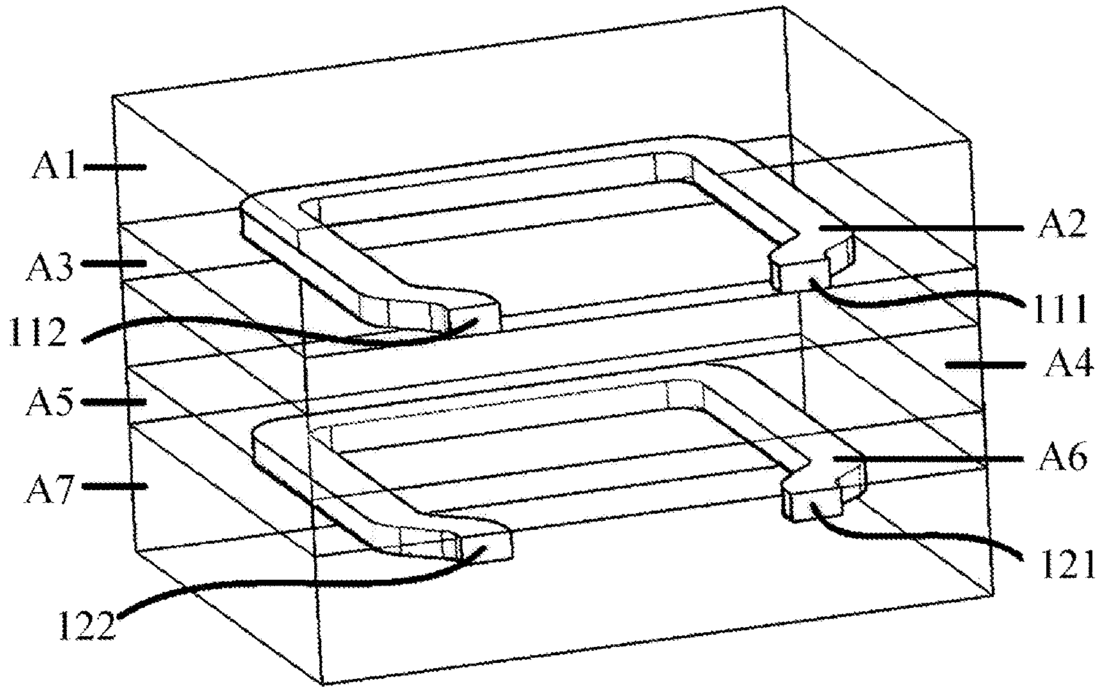
FIG. 5 is a stereoscopic perspective view of a magnet provided with two coils according to embodiments of the present application.
Figure 6:
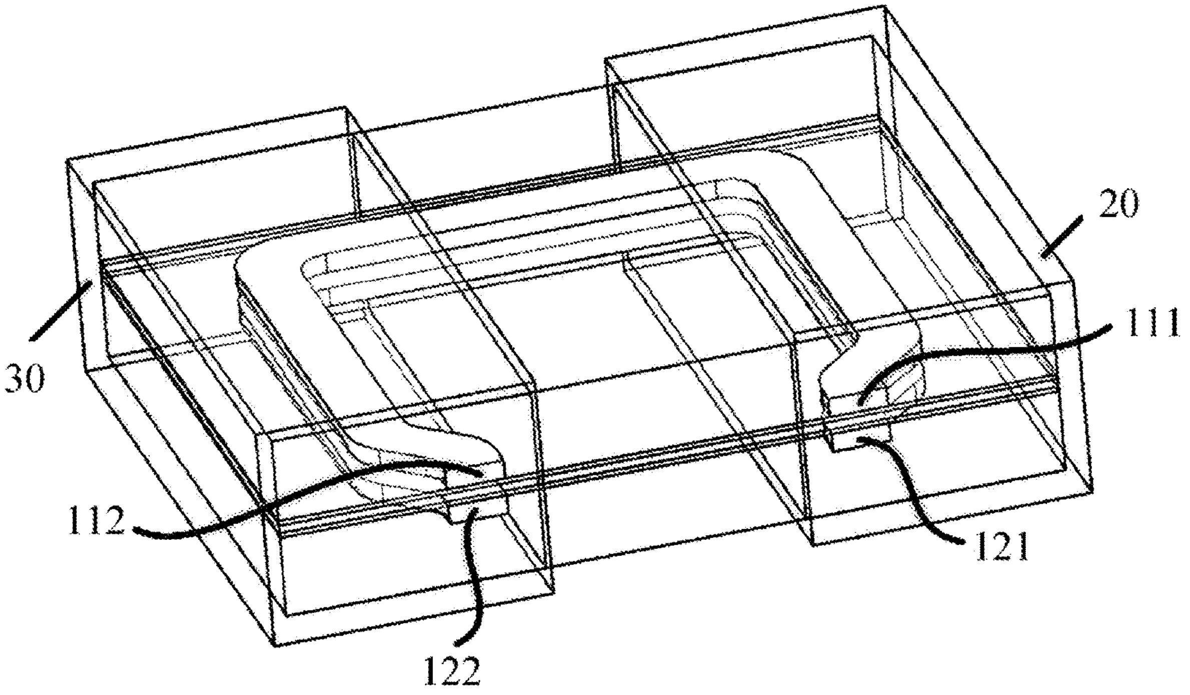
FIG. 6 is a stereoscopic perspective view of a thin-film transistor provided with two coils according to embodiments of the present application.

In an embodiment, in a case where n=1 (that is, the number of coils of the thin-film power transistor is two), FIG. 5 is a stereoscopic perspective view of a magnet provided with two coils according to embodiments of the present application. FIG. 6 is a stereoscopic perspective view of a thin-film transistor provided with two coils according to embodiments of the present application. As shown in FIGS. 5 and 6, the first upper coil A2 and the first lower coil A6 each includes a first end and a second end. The first end 111 of the first upper coil A2 and the first end 121 of the first lower coil A6 are exposed to a same surface of the magnet and are both electrically connected to the first port electrode 20. The second end 112 of the first upper coil A2 and the second end 122 of the first lower coil A6 are exposed to a same surface of the magnet and are both electrically connected to the second port electrode 30.

Figure 7:
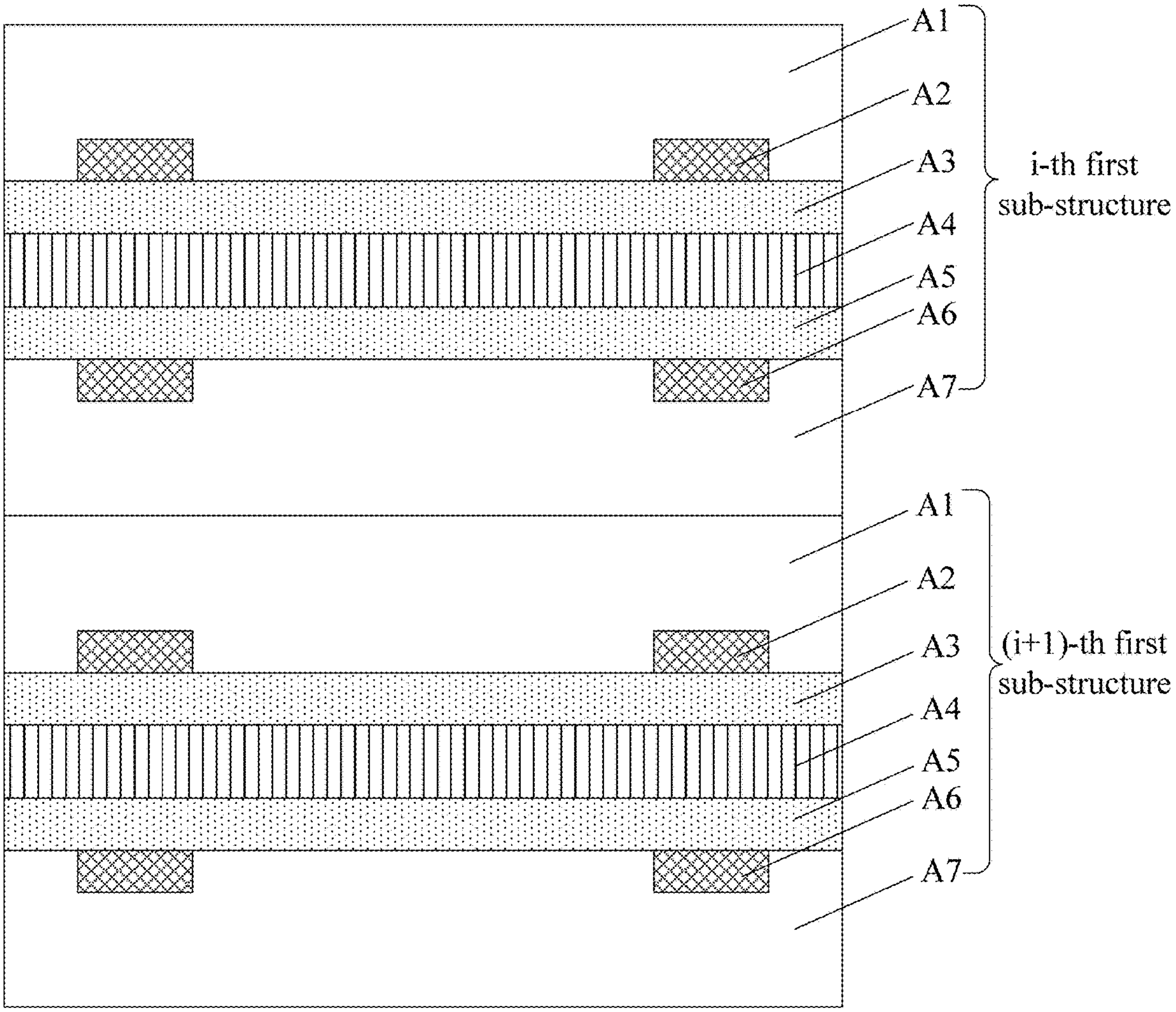
FIG. 7 is a section view of a magnet provided with four coils according to embodiments of the present application.

Further in an embodiment, when n=2 (that is, the number of coils of the thin-film power transistor is four), FIG. 7 is a section view of a magnet provided with four coils according to embodiments of the present application. As shown in FIG. 7, two first sub-structures, i.e., the i-th first sub-structure and the (i+1)-th first sub-structure as illustrated in FIG. 7, are stacked. In an embodiment, the first upper functional layer A1 and the first lower functional layer A7 adjacent to the first upper functional layer A1 may be a same layer and are formed in a same process.

In a second possible implementation, when the number of coils of the thin-film power transistor is 2n+1 (n is a positive integer), the magnet 10 includes n first sub-structures and one second sub-structure that are stacked.

Figure 8:
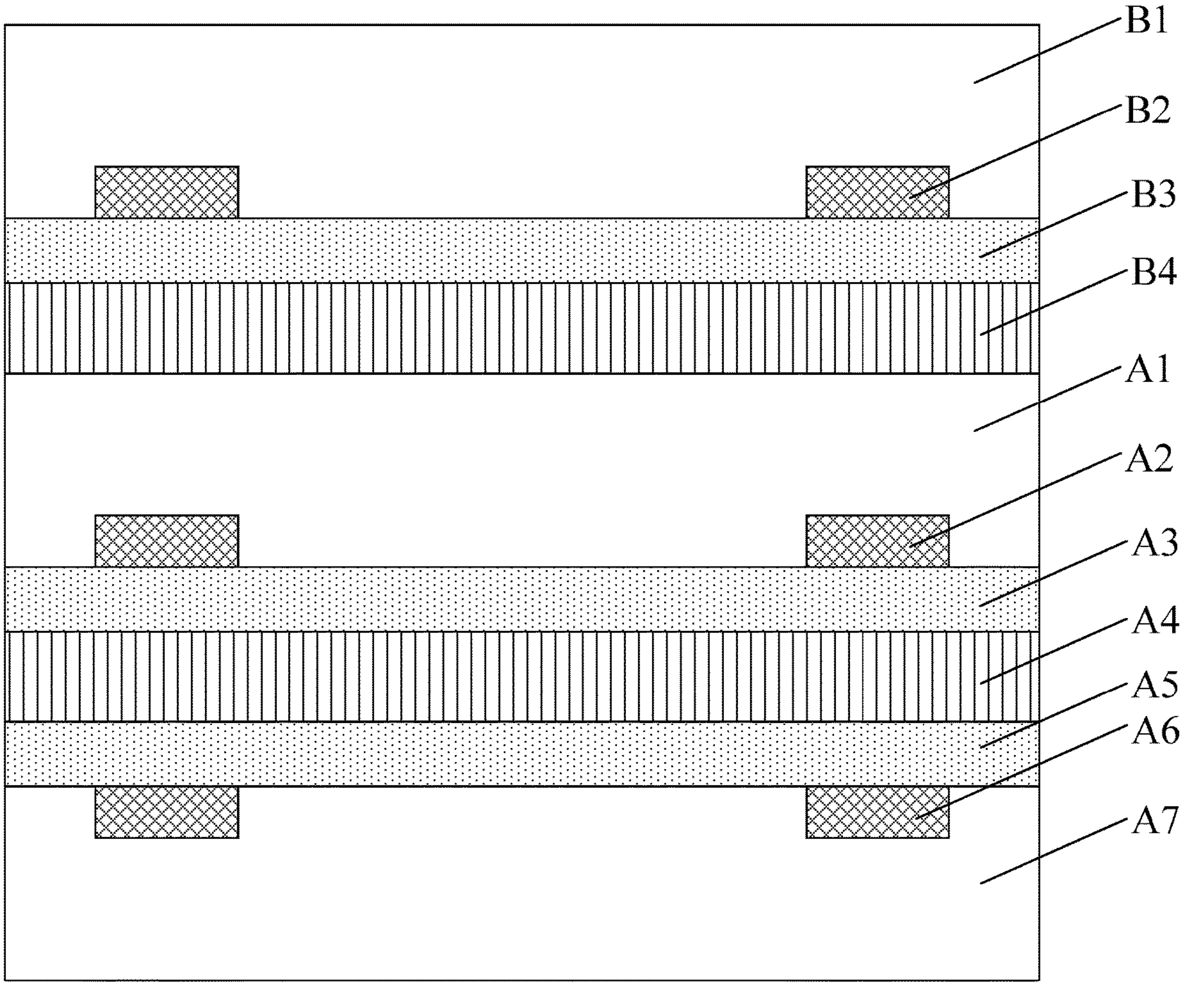
FIG. 8 is a section view of a magnet provided with three coils according to embodiments of the present application.
Figure 9:
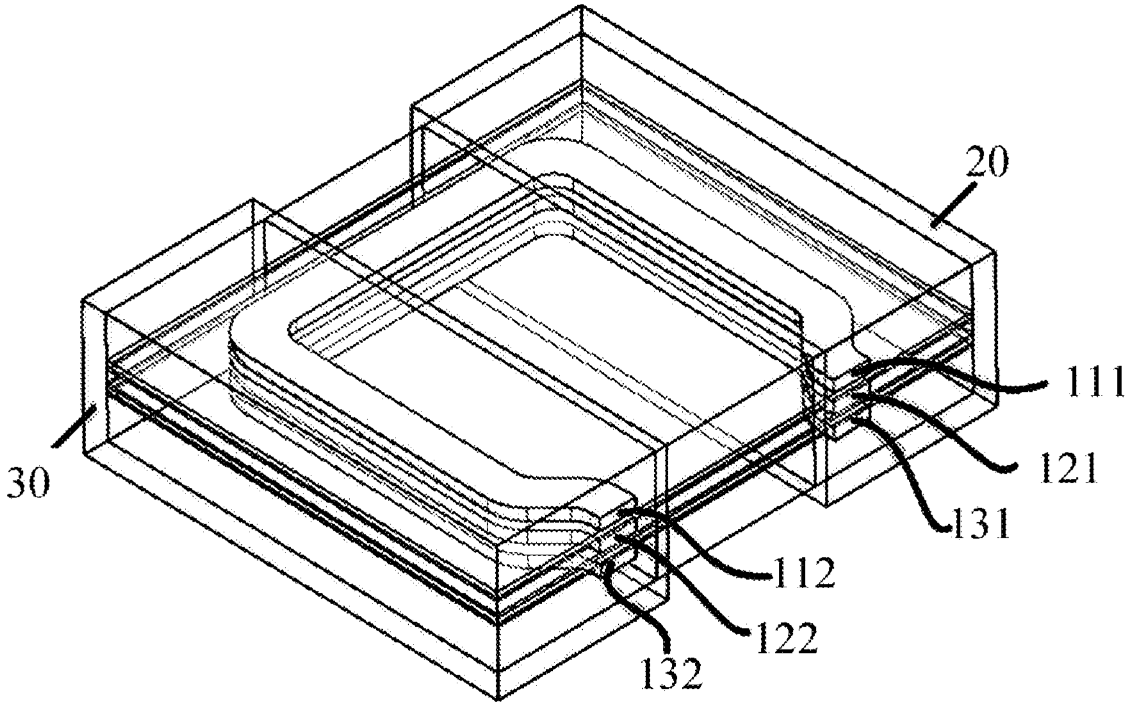
FIG. 9 is a stereoscopic perspective view of a thin-film transistor provided with three coils according to embodiments of the present application.

In an embodiment, when n=1 (that is, the number of coils of the thin-film power transistor is three), FIG. 8 is a section view of a magnet provided with three coils according to embodiments of the present application. FIG. 9 is a stereoscopic perspective view of a thin-film transistor provided with three coils according to embodiments of the present application. As shown in FIGS. 8 and 9, the magnet includes a second sub-structure and a first sub-structure that are stacked.

The first upper coil A2, the first lower coil A6, and the second coil B2 each includes a first end and a second end. The first end 111 of the first upper coil A2, the first end 121 of the first lower coil A6, and the first end 131 of the second coil B2 are exposed to a same surface of the magnet and are all electrically connected to the first port electrode 20. The second end 112 of the first upper coil A2, the second end 122 of the first lower coil A6, and the second end 132 of the second coil B2 are exposed to the same surface of the magnet and are all electrically connected to the second port electrode 30.

Figure 10:
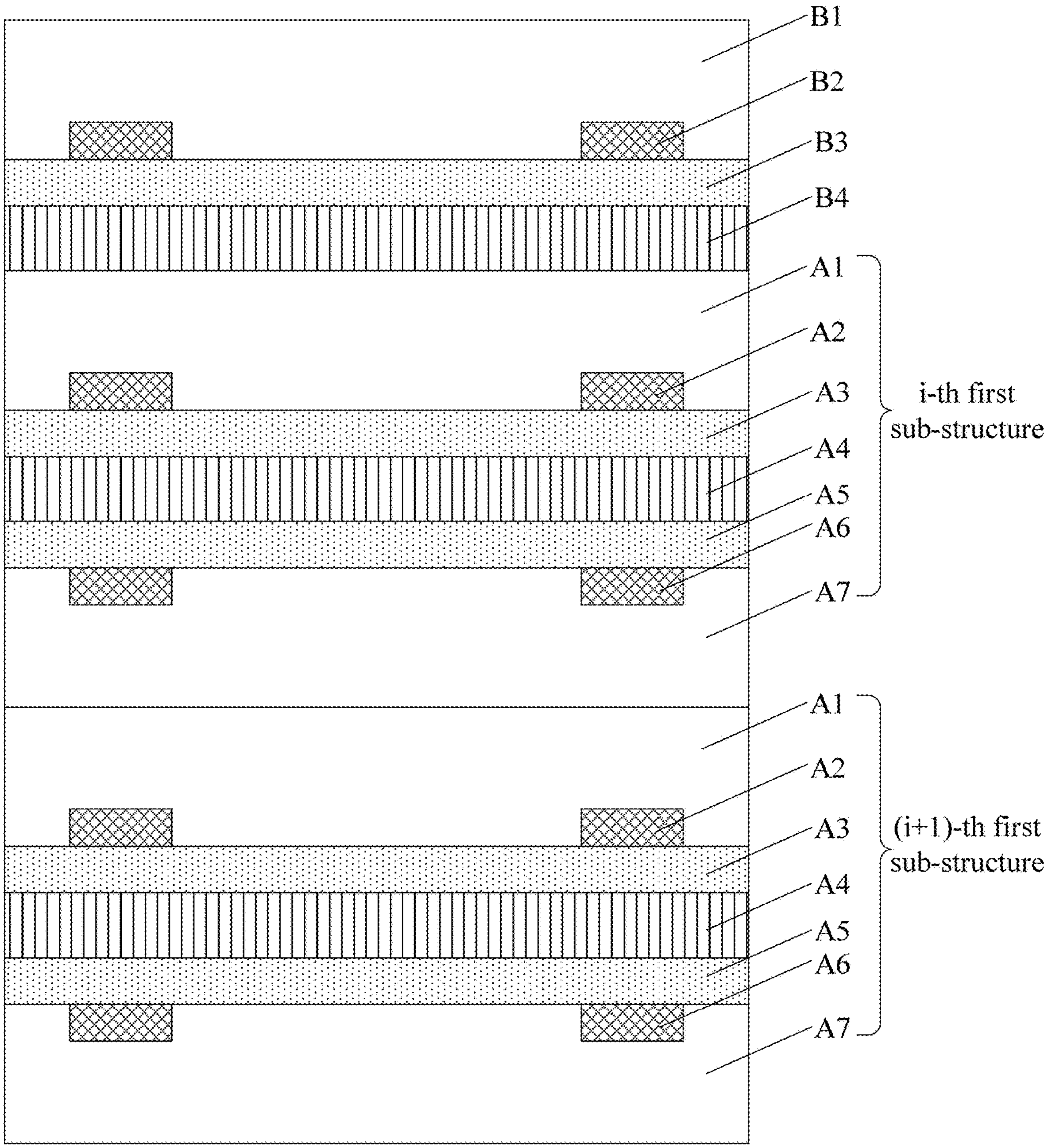
FIG. 10 is a section view of a magnet provided with five coils according to embodiments of the present application.

Further in an embodiment, when n=2 (that is, the number of coils of the thin-film power transistor is five), FIG. 10 is a section view of a magnet provided with five coils according to embodiments of the present application. As shown in FIG. 10, one second sub-structure and two first sub-structures, i.e., the i-th first sub-structure and the (i+1)-th first sub-structure as illustrated in FIG. 10, are stacked. In some embodiment, the first upper functional layer A1 and the first lower functional layer A7 adjacent to the first upper functional layer A1 may be a same layer and are formed in a same process.

Figure 11:
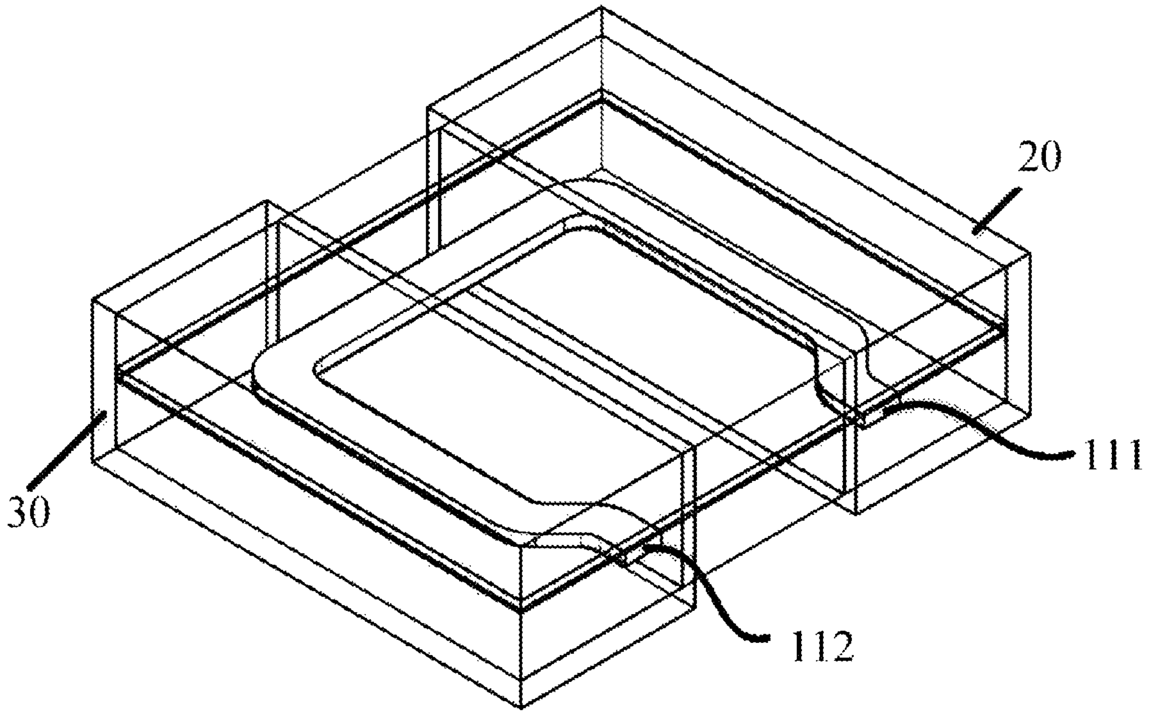
FIG. 11 is a stereoscopic perspective view of a thin-film transistor provided with one coil according to embodiments of the present application.

In a third possible implementation, when the number of coils of the thin-film power inductor is one, the magnet 10 includes one third sub-structure. FIG. 11 is a stereoscopic perspective view of a thin-film transistor provided with one coil according to embodiments of the present application. As shown in FIG. 11, the third coil C2 includes a first end 111 and a second end 121. The first end 111 of the third coil C2 is exposed to the surface of the magnet and is electrically connected to the first port electrode 20. The second end 121 of the third coil C2 is exposed to the surface of the magnet and is electrically connected to the second port electrode 30.

Optionally, when the number of coils of the thin-film power inductor is not less than two, each two coils are coupled to each other and have a same shape. In this manner, the inductance of the thin-film power inductor is increased.

Optionally, when the number of coils of the thin-film power inductor is not less than two, the thin-film power inductor is a common-mode power inductor or a differential-mode power inductor.

Optionally, the thin-film power inductor is a common-mode power inductor. Each two coils are designed in the same direction. In this manner, a direct current resistance is reduced and an inductance is increased.

The thin-film power inductor is a differential-mode power inductor. Each two coils are designed in opposite directions. In this manner, the direct current resistance is increased and the inductance is reduced.

Optionally, the functional layers of the thin-film power inductor are made of a magnetic material. The magnetic material for manufacturing the functional layers may be processed with insulating.

Optionally, the magnetic material may be a soft magnetic alloy. The soft magnetic alloy is a magnetic material with high saturation flux density, low coercive force, and high magnetic permeability.

Optionally, the coils of the thin-film power inductor may be made of a metal or a metal alloy. Specifically, the metal or the metal alloy may have a low resistivity.

Optionally, the size of the thin-film power inductor provided in embodiments of the present application may be designed based on actual needs. For example, the size of the thin-film power inductor may be 1.2 mm×1.0 mm×0.3 mm; a width of a coil is 100 μm; and a thickness of the coil is 30 μm.

The present application provides a thin-film power inductor. The thin-film power inductor includes a magnet, a first port electrode, and a second port electrode. The first port electrode and the second port electrode are disposed on the outer surface of the magnet separately. When the number of coils of the thin-film power inductor is not less than two, the magnet includes at least one first sub-structure. A first sub-structure includes a first upper functional layer, a first upper coil, a first upper adhesive layer, a first insulating layer, a first lower adhesive layer, a first lower coil, and a first lower functional layer that are stacked in sequence. The first upper coil and the first lower coil each includes a first end and a second end. The first end of the first upper coil and the first end of the first lower coil are exposed to a same surface of the magnet and are both electrically connected to the first port electrode. The second end of the first upper coil and the second end of the first lower coil are exposed to a same surface of the magnet and are both electrically connected to the second port electrode. The arrangement in which two ends of a coil of the thin-film power inductor are exposed to the surface of the magnet directly and are electrically connected to the first port electrode and the second port electrode respectively enables the electrodes to be introduced rapidly. Moreover, no puncture connection, no via layer, or no electrical connection is needed between the coils, facilitating a further miniaturization. Compared with a thin-film power inductor in the related art, the thin-film power inductor provided by the present application makes a full utilization of the three-dimensional multilayer space and reduces volumes required by the elements, thus having the advantages including a simple structure, a large inductance, a small direct current resistance, and an easy miniaturization.

What is claimed is:

1. A thin-film power inductor, comprising a magnet, a first port electrode, and a second port electrode, wherein the first port electrode and the second port electrode are disposed on an outer surface of the magnet separately;

wherein the magnet comprises n first sub-structures that are stacked, and n is an integer greater than or equal to 2, wherein each of the n first sub-structures comprises a first upper functional layer, a first upper coil, a first upper adhesive layer, a first insulating layer, a first lower adhesive layer, a first lower coil, and a first lower functional layer that are stacked in sequence; and wherein the first insulating layer is free of vias; and wherein the first upper coil and the first lower coil each comprise a first end and a second end, the first end of the first upper coil and the first end of the first lower coil are exposed to a same surface of the magnet and are both electrically connected to the first port electrode, and the second end of the first upper coil and the second end of the first lower coil are exposed to a same surface of the magnet and are both electrically connected to the second port electrode.

2. The thin-film power inductor according to claim 1, wherein the magnet further comprises one second sub-structure, and wherein the n first sub-structures and the second sub-structure are stacked;

wherein the second sub-structure comprises a second functional layer, a second coil, a second adhesive layer, and a second insulating layer that are stacked in sequence; and wherein the second coil comprises a first end and a second end, wherein the first end of the second coil, the first end of the first upper coil, and the first end of the first lower coil are exposed to a same surface of the magnet and are all electrically connected to the first port electrode, and wherein the second end of the second coil, the second end of the first upper coil, and the second end of the first lower coil are exposed to a same surface of the magnet and are all electrically connected to the second port electrode.

3. The thin-film power inductor according to claim 2, wherein the second insulating layer is free of vias.

4. The thin-film power inductor according to claim 1, wherein each two coils are coupled to each other and have a same shape.

5. The thin-film power inductor according to claim 1, wherein the thin-film power inductor is a common-mode power inductor or a differential-mode power inductor.

6. The thin-film power inductor according to claim 5, wherein in a case where the thin-film power inductor is the common-mode power inductor, the each two coils are designed in a same direction.

7. The thin-film power inductor according to claim 5, wherein in a case where the thin-film power inductor is the differential-mode power inductor, the each two coils are designed in opposite directions.

8. The thin-film power inductor according to claim 1, wherein functional layers of the thin-film power inductor are made of a magnetic material.

9. The thin-film power inductor according to claim 8, wherein the magnetic material is a soft magnetic alloy.

10. The thin-film power inductor according to claim 9, wherein the soft magnetic alloy is a magnetic material with high saturation flux density, low coercive force, and high magnetic permeability.

11. The thin-film power inductor according to claim 1, wherein coils of the thin-film power inductor are made of a metal or a metal alloy.

12. The thin-film power inductor according to claim 11, wherein coils of the thin-film power inductor are made of a metal or a metal alloy with low resistivity.

13. The thin-film power inductor according to claim 1, wherein among the n first sub-structures, a first upper functional layer of an (i+1)-th first sub-structure and a first lower functional layer of an i-th first sub-structure adjacent to the first upper functional layer of the (i+1)-th first sub-structure are made of a same material and manufactured using a same manufacturing process, and i is an integer greater than or equal to 1 and less than or equal to n−1.

* * * * *